April 2, 1963 W. E. GRAYBEAL 3,083,808
TRANSFER MECHANISM FOR CONVEYORS
Filed Aug. 30, 1961 4 Sheets-Sheet 2
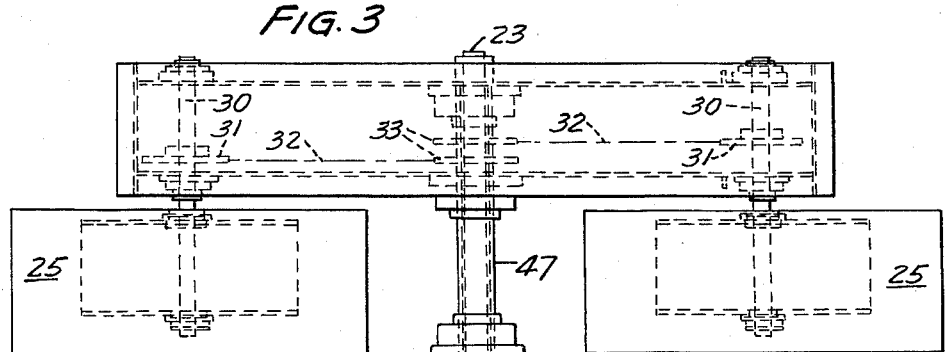
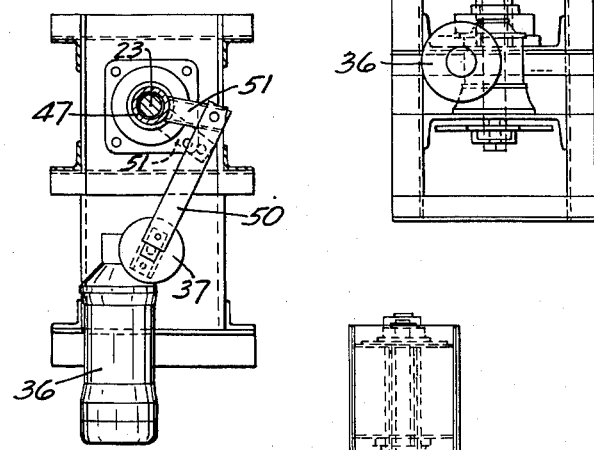
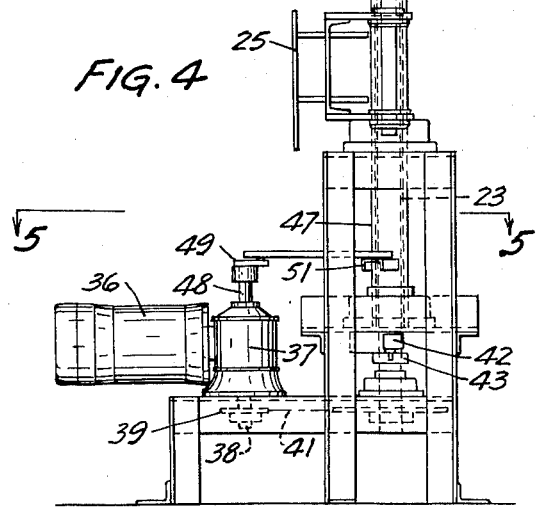
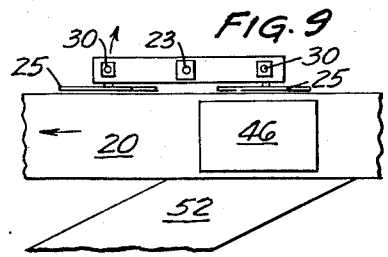
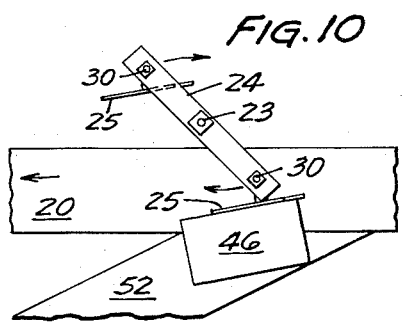
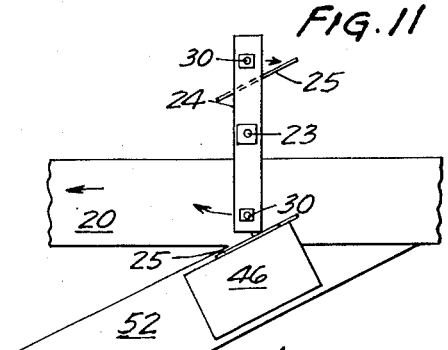
INVENTOR
WARREN E. GRAYBEAL
BY
ATTORNEY April 2, 1963  W. E. GRAYBEAL  3,083,808
TRANSFER MECHANISM FOR CONVEYORS
Filed Aug. 30, 1961  4 Sheets-Sheet 3

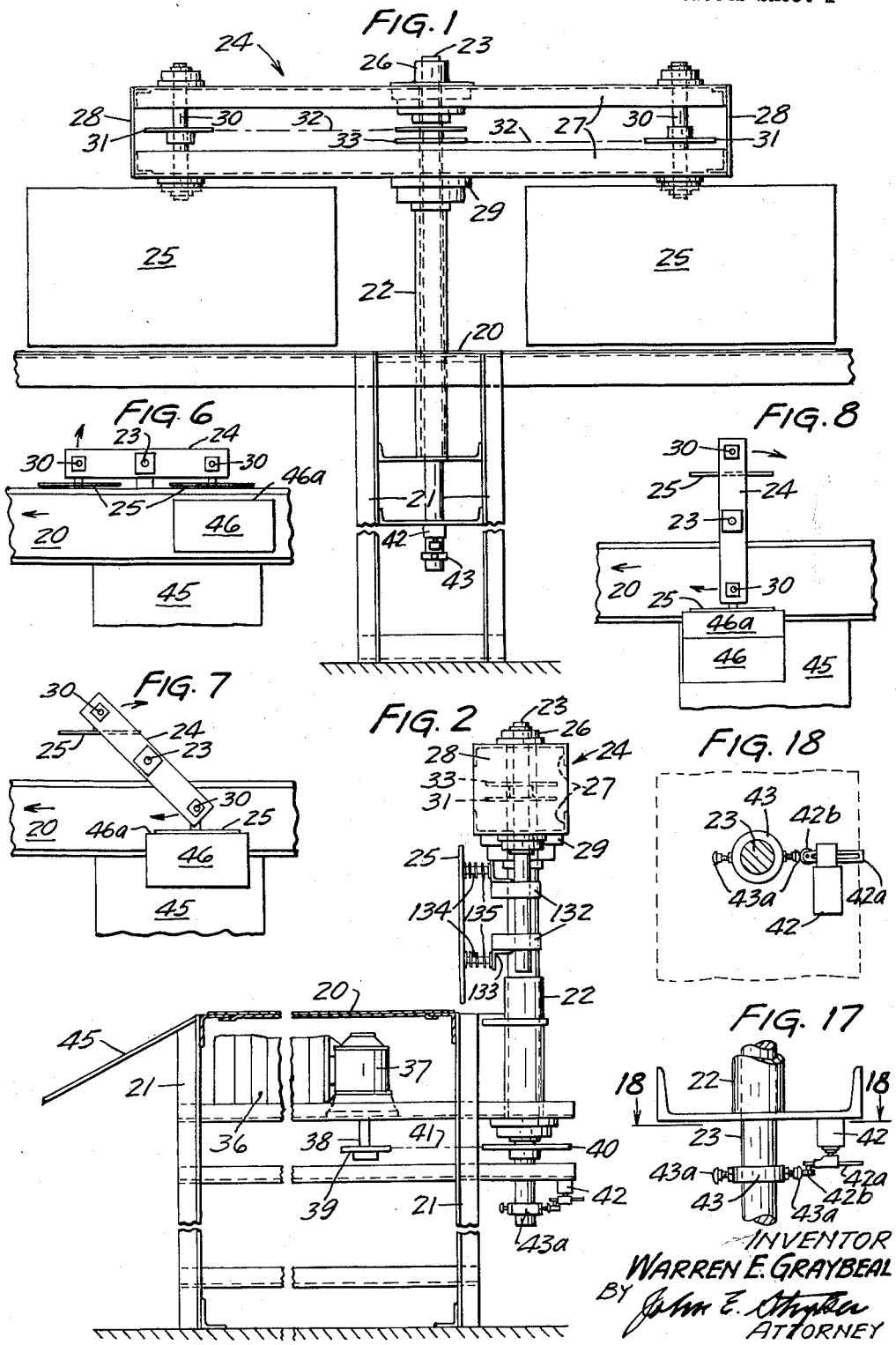

INVENTOR
WARREN E. GRAYBEAL
BY
ATTORNEY

April 2, 1963 W. E. GRAYBEAL 3,083,808
TRANSFER MECHANISM FOR CONVEYORS
Filed Aug. 30, 1961 4 Sheets-Sheet 4
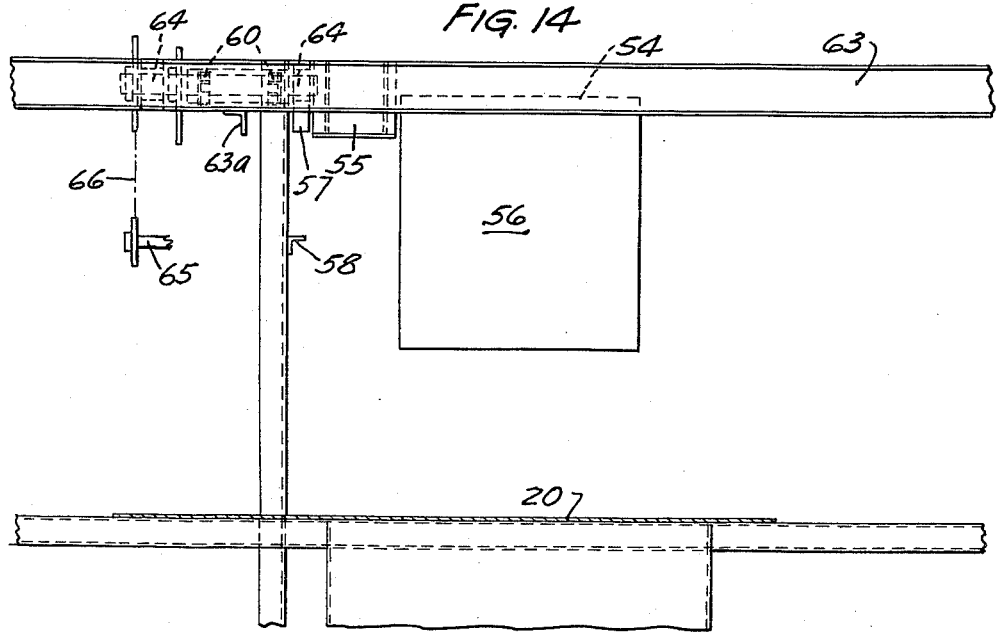
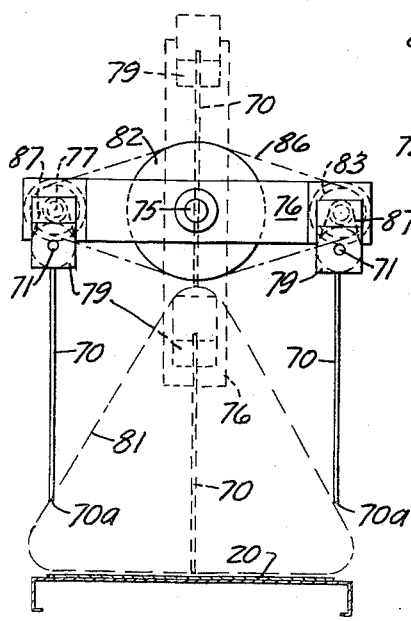
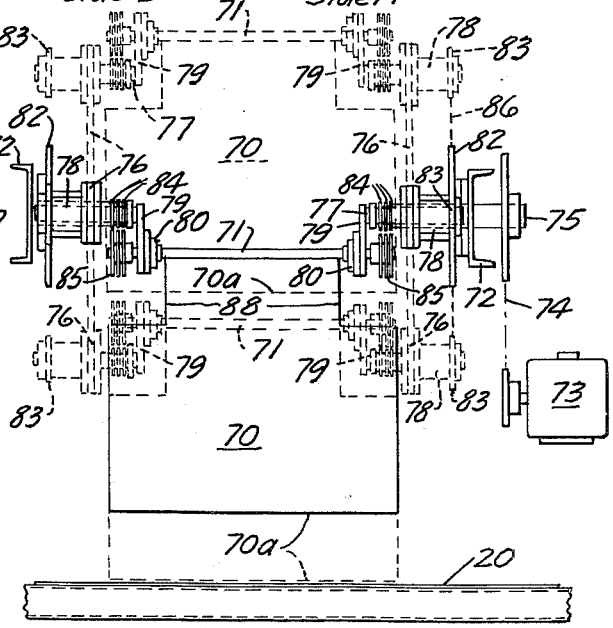
INVENTOR
WARREN E. GRAYBEAL
BY John E. Thyfen
ATTORNEY United States Patent Office 3,083,808
Patented Apr. 2, 1963

1

3,083,808
TRANSFER MECHANISM FOR CONVEYORS
Warren E. Graybeal, Stillwater, Minn., assignor to Standard Conveyor Company, St. Paul, Minn., a corporation of Minnesota
Filed Aug. 30, 1961, Ser. No. 135,012
18 Claims. (Cl. 198—20)

This invention relates to mechanism for transferring or removing load units of a wide range of sizes and shapes from a conveyor at predetermined locations and particularly to mechanism for automatically removing load units laterally or obliquely from a substantially horizontally moving main conveyor at load receiving or transfer stations spaced along the conveyor.

Heretofore various types of transfer mechanisms and diverters have been used with conveyors and in commodity sorting systems but have not been entirely satisfactory where maximum speed consistent with the size and weight of the load units to be handled is desired. An excessive interval of time is usually required for the diverter members to clear the path for the successive load units carried by the conveyors. Thus the simpler, high speed mechanisms which utilize paddles, rams or like load engaging members to sweep the load units laterally from the conveyor must return in a reverse direction across the conveyor path to a starting position before the diverting operation can be repeated. This has made it necessary to space the successive load units a considerable distance apart along the conveyor, or alternatively, to stop and store the units on the conveyor in order to allow time for each diverter operation. Both of these expedients cause undesirable delay between successive diverting operations at each of the diverter locations. In systems where there are large numbers of load receiving or transfer stations and automatic controls for the several diverters, the sorting rate has been particularly slow and inefficient.

It is, therefore, an object of my invention to increase the sorting rate in conveyor systems of the class described by providing transfer mechanism which is operative to reduce the diverter time cycle and generally improve the efficiency and reliability of the transfer operations.

A particular object is to provide for a conveyor of the class described, transfer mechanism comprising a plurality of paddles which are power actuated to move in a generally circular, unidirectional arc or orbit across the path of the load units carried by the conveyor, whereby each paddle clears the path for the succeeding paddle to engage and remove a closely spaced succeeding load unit carried by the conveyor.

Another object is to provide means for interrupting the orbital movement of transfer paddles intermittently when they have turned to a position in which at least one of them is in a retracted position closely adjacent to one side of the path of successive load units as they arrive at the diverter station.

Other objects will appear and be more fully pointed out in the following specification and claims.

Referring to the accompanying drawings which illustrate certain embodiments of my invention, by way of example and not for the purpose of limitation:

FIGURE 1 is a side elevational view showing one of the simpler embodiments of my improved transfer mechanism, together with a fragmentary portion of a conveyor;

FIG. 2 is an elevational view of the same mechanism as viewed from the right of FIG. 1;

FIG. 3 is a front elevational view showing another modification of the transfer mechanism;

FIG. 4 is an elevational view of the mechanism shown in FIG. 3, as viewed from the right thereof;

FIG. 5 is a fragmentary horizontal sectional view taken on the line 5—5 of FIG. 4;

FIGS. 6, 7 and 8 are schematic plan views showing the modification of FIGS. 1 and 2 with the paddles in three successive positions as in the transfer of a load unit from the main conveyor to a receiving station;

FIGS. 9, 10 and 11 are schematic plan views showing the modification of FIGS. 3, 4 and 5 with the paddles in typical positions as in the removal of a load unit obliquely from the main conveyor to a branch conveyor;

FIG. 14 is an elevational view of the same modification as seen from the right of FIG. 13;

FIGS. 15 and 16 are, somewhat schematic, end and side elevational views respectively showing a further modification of the transfer mechanism;

FIG. 17 is a side elevational view of a limit switch and actuating mechanism therefor suitable for deactivating the transfer mechanism hereinafter described, and FIG. 18 is a horizontal sectional view taken on the line 18—18 of FIG. 17.

Figure 12:
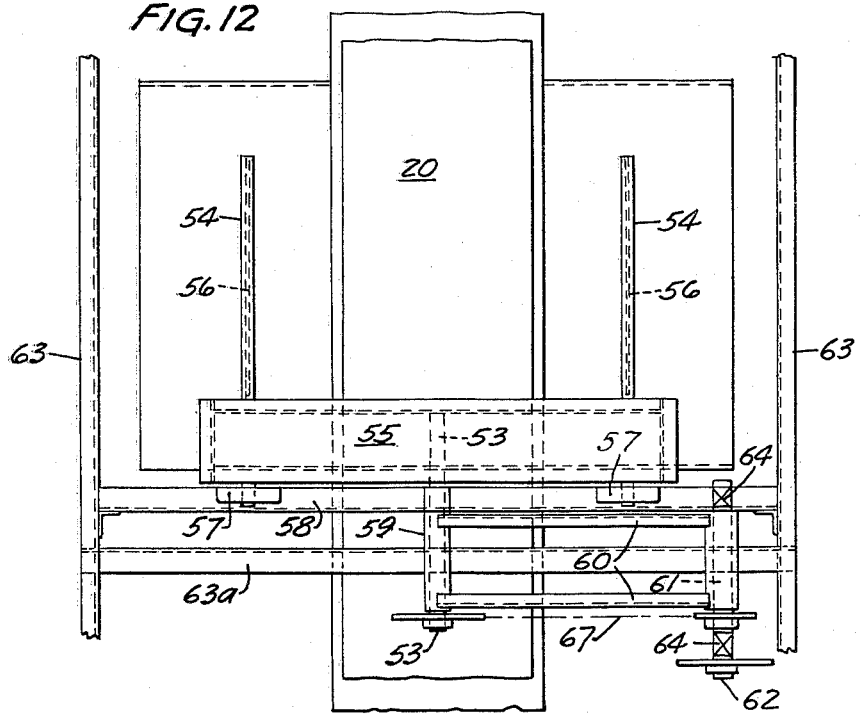
FIG. 12 is a plan view showing another modification wherein the paddles depend from horizontally extending shafts.

In the drawings, a conveyor of conventional type is indicated generally by the numeral 20. This conveyor may be of the endless belt, chain, slat, live roller or other type suitable for moving load units along a determined path. My improved transfer mechanism is particularly adapted for use in automatic sorting systems and other conveyor systems having a series of load receiving or transfer stations spaced along a main conveyor such as the conveyor 20. As shown in FIGS. 1 and 2, the transfer mechanism includes a suitable frame 21 projecting at one side of the conveyor 20 and including a vertically elongated tubular support 22 and bearings for a vertical shaft 23. Suitable journal bearings for the shaft 23 are provided on the support 22.

A rigid arm structure 24 projects at opposite sides of the shaft 23 to support a pair of paddles 25. As shown, the paddles 25 are flat vertically disposed plates of sufficient vertical and horizontal extent to contact elongated side surface areas of the load units to be transferred. A hub 26 is rigidly connected to the upper end portion of the shaft 23 and has an integral flange which is rigidly fastened to the arm structure 24. This structure includes pairs of horizontally extending bars 27 connected by end plates 28. At its lower side the structure 24 is supported on a thrust bearing 29 which is fixed on the tubular support 22 so that the structure 24 is free to rotate with the shaft 23 about the axis of the latter.

Equally spaced at opposite sides of the shaft 23 are paddle shafts 30 having suitable journal bearings carried by the arm structure 24. Power transmission linkage is provided for rotating the shafts 30 in unison with the rotary motion of the arm structure 24. The linkage for each paddle shaft includes a sprocket wheel 31 fixed on the shaft 30, a sprocket chain indicated schematically at 32 and a sprocket wheel 33 fixed on the tubular support 22. This connection provides a one to one power transmission ratio so that for each complete revolution of the shaft 23 the paddle shafts 30 are rotated 360° about their axes. Each of the paddles 25 is connected to its supporting shaft 30 by pairs of rigid bracket members 132 and 133 carrying horizontally projecting guide pins 134. These pins project at right angles to the paddles and are rigidly connected thereto. To cushion the impact of the paddles on the load units, helical compression springs 135 are confined on the pins 134 between each paddle and its bracket member 133, and the pins are retractable axially in bearings in the bracket members so that the springs may be compressed when a paddle strikes a load unit at a safe high speed.

Power means for rotating the shaft 23 about its axis may comprise an electric motor 36 operatively connected to the shaft 23 through speed reducing gearing in a housing 37. From the lower side of the housing 37 a driven shaft 38 has a sprocket wheel 39 fixed thereon and this sprocket wheel is operatively connected by a sprocket chain 41 to another sprocket wheel 40 fixed on the shaft 23. Rotation of the shaft 23 may be interrupted after each 180° of angular movement by a control which may include a limit switch 42 included in the circuit for energizing the motor 36 and a cam 43 fixed on the lower end portion of the shaft 23. As shown in FIGS. 17 and 18 the cam 43 has lobes 43a which project at 180° one from the other to actuate an arm 42a carrying a follower roller 42b for actuating the switch 42. The motor 36 may thereby be deenergized after each 180° of angular motion of the paddle shafts 30 and shaft 23. The motor 36 is provided with a brake of conventional type for stopping the rotation instantaneously when the motor is deenergized under control of limit switch 42.

Referring to the schematic views, FIGS. 6, 7 and 8, a load receiving station is indicated at 45 and a load unit for removal from the conveyor 20 to the station 45 is shown at 46. This load unit is of rectangular box shape and has a longitudinal side 46a which receives the impact of the paddles 25. FIG. 6 shows the position of the paddles in their retracted position at one side of the conveyor 20. Energization of the motor 36 connected to the shaft 23 may be instituted by remote control when a load unit reaches a predetermined position for transfer to a load receiving station. Since automatic controls suitable for energizing my transfer mechanism are known and commercially available they form no part of the present invention. One suitable control is described in Patent No. 2,825,476, granted March 4, 1958, to Donald C. Muller.

Assuming that the motor 36 is energized as the load unit 46 reaches a position such as that indicated in FIG. 6, the shaft 23 and paddle structure 24 will be rotated in a clockwise direction to swing the paddle 25 at the right of FIG. 6 in an arc across the conveyor 20. As the arm structure 24 turns, the paddle shafts 30 are turned together with the paddles 25 so that the latter are retained in positions which are parallel to the direction of travel of units on the conveyor 20 throughout the 180° cycle of operation. Typical operative positions of the paddles and their supporting structure are shown in FIGS. 7 and 8. As indicated in FIG. 8, the load unit 46 is thus completely removed from the path of succeeding units on the conveyor when the paddle structure has turned 90° from its starting position. Rotation continues through another angle of 90°, whereupon the motor is deenergized with both paddles retracted, as shown in FIG. 6. The orbital movement of the paddles across the conveyor is unidirectional and upon the completion of one transfer stroke the paddles are in a position to transfer a succeeding load unit from the conveyor 20 to the load receiving station 45.

Referring to the form of the invention shown in FIGS. 3, 4, 5, 9, 10 and 11, provision is made for modifying the angular movement of the paddles 25 so that they push the load units off of the main conveyor to a branch conveyor while positively turning them to an oblique angle corresponding to that of the branch conveyor. This modification includes a tubular, coaxial casing 47 containing the shaft 23 and disposed to be oscillated about its axis independently of the shaft. The sprocket wheels 33 are fixed coaxially on the sleeve 47. As shown in FIGS. 4 and 5, a driven shaft 48 projects upwardly from the gear housing 37 and is fitted with a crank arm 49 having an eccentric connection with a rigid link 50 having a pivot connection with an arm 51 projecting from and rigidly connected to the shaft casing 47.

In operation of the mechanism shown in FIGS. 3, 4 and 5, the shaft 48 is rotated in unison with the shaft 38 and the motor 36 is energized intermittently under control of the limit switch 42 and cam 43, the latter being fixed on the lower end portion of the shaft 23. During each cycle of operation the linkage between the shaft 48 and casing 47 causes the latter to be oscillated through an angle such as that indicated by the full line and broken line positions of the arm 51 (FIG. 5). The effect of this is indicated in FIGS. 9, 10 and 11 wherein a branch conveyor 52 is shown extending obliquely from the side of the main conveyor 20 opposite the transfer mechanism. Starting from the retracted, dwell position shown in FIG. 9, upon arrival of a unit 46 at the entrance of the branch conveyor 52 the adjacent paddle 25 is moved out across the main conveyor to strike a large side area of the load unit 46, and not only move the unit laterally but also turn it to a position corresponding to the angle of the branch conveyor, as indicated, for example, by the positions of the mechanism shown in FIGS. 10 and 11. Thus the paddles turn the load units to orient them with their longitudinal dimension extending in the direction of travel along the branch conveyor. From the position shown in FIG. 11, the paddles and their support turn 90° in a clockwise direction to the starting, dwell position shown in FIG. 9.

Figure 13:
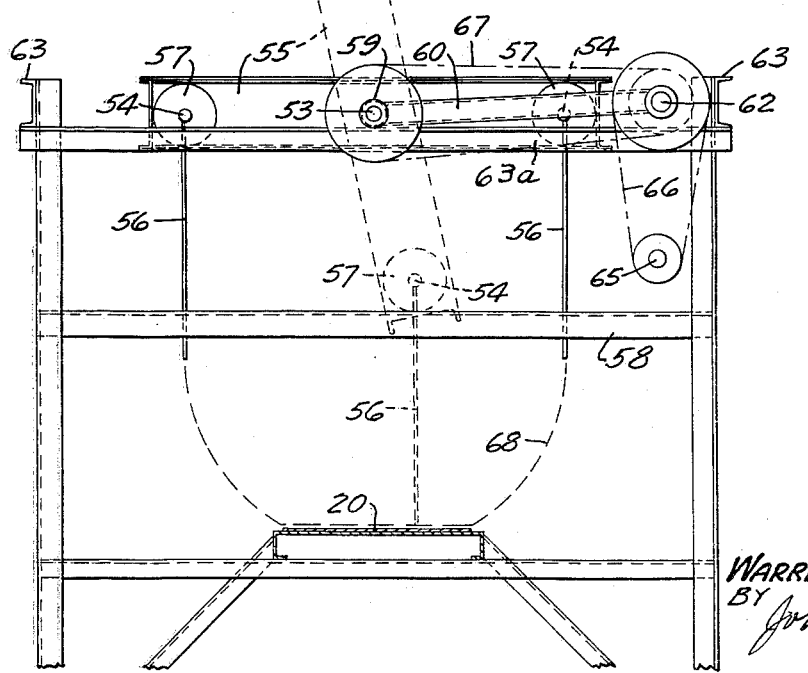
FIG. 13 is an elevational view of the modification shown in FIG. 12.

FIGS. 12, 13 and 14 illustrate a modification of the invention which is particularly adapted for installations where the load units are to be selectively transferred to either side of the main conveyor 20. A power-driven shaft 53 and a pair of paddle supporting shafts 54 extend horizontally above and longitudinally with respect to the direction of movement of the load units along the conveyor 20. These shafts are mounted on a rigid arm structure 55 with the paddle shafts 54 supported at equal distances from opposite sides of the shaft 53 on the rigid arm structure 55. Each paddle 56 is fixed on and depends from one of the shafts 54 and is operatively connected to a fixed sprocket wheel, like the sprocket wheels 22 shown in FIG. 1, so that the paddles 56 are maintained in substantially parallel relation one to the other and to the sides of the conveyor 20 during their movement across the conveyor to and from their dwell positions.

An end of each of the shafts 54 projects from the arm structure 55 and carries a wheel 57 disposed to contact and roll along a horizontally extending frame member 58 during each transfer operation. A tubular member 59 contains the shaft 53 and is rigidly connected to the arm structure 55. From one side of the tubular member 59 a pair of parallel arms 60 project substantially horizontally, being rigidly connected at one end to the member 59 and rigidly connected at their other ends to a tubular bearing 61 containing a jack shaft 62 which is free to turn in the bearing 61. Both ends of the jack shaft 62 project from the bearing 61 and are supported on main frame members 63, 63a in pillow block bearings indicated schematically at 64. A motor driven shaft 65 is operatively connected by a chain drive 66 to the shaft 62 which is connected by a chain drive 67 to the shaft 53.

In operation, when the motor driving shaft 65 is energized, the sprocket drives 66 and 67 cause the shaft 53 to be turned. The arm structure 55 is thereby turned with the shaft 53 and the shafts 54 carrying the paddles 56 are moved in arcs and retained in substantially vertical planes by chain drive mechanism like the sprocket wheels 31 and 33 and chains 32 shown in FIGS. 1 and 2. When the downwardly moving wheel 57 makes contact with the top horizontally extending surface of the frame member 58, the arm structure 55 continues to turn, and this structure and the members carried thereby are lifted from the frame member 63a in an arc about the axis of the jack shaft 62 by cam action. Thereupon, the wheel 57 and coaxial paddle shaft 54 move horizontally along the frame member 58, as indicated in broken lines in FIG. 13. Thus the motion of the paddles 56 is modified to cause the lower edge of the lower one to sweep substantially horizontally directly across the conveyor 20. The cam action of the wheel 57 on the horizontal member 58 reaches its apex when the wheel 57 and paddle 56 is directly over the center line of the conveyor. From this position the arm structure, shaft 53 and tubular member 59 are lowered until the member 59 rests on the frame member 63a. The arm structure then continues to turn until it reaches its horizontal position shown in full lines, with the paddles 56 in their retracted, dwell position, ready for the next diverting operation. The shaft 53 may be rotated in either direction 180° to effect the transfer of a load unit selectively to one side or to the other side of the conveyor 20. A reversible direction motor may be provided for driving the shaft 65 and may be deenergized by suitable means including a limit switch such as that shown in FIGS. 17 and 18.

FIGS. 15 and 16 illustrate a modification of my invention which is particularly adapted for installations where the overhead space available for the transfer mechanism along the main conveyor is extremely limited. Like the modification shown in FIGS. 12, 13 and 14, that shown in FIGS. 15 and 16 is adapted to remove load units selectively to either the right side or left side of the main conveyor 20. A pair of paddles 70 depend from paddle supporting shafts 71 extending horizontally above and longitudinally of the main conveyor. As best shown in FIG. 16 the paddle shafts 71 are supported at their ends by duplicate actuating mechanism indicated as side A and side B which are spaced longitudinally of the main conveyor.

Referring to side A, there is a supporting frame member 72 extending horizontally across the conveyor 20 and adapted to be supported by other suitable frame members, not shown. An electric motor 73 is connected by a chain drive, indicated generally at 74, to a horizontal center pivot shaft 75 having a bearing support on the frame member 72. This center shaft 75 is rigidly connected to an arm structure 76 carrying near each end a wing shaft 77 supported in a bearing 78. Wing arms 79 are severally pinned to the ends of the shafts 77. Each of the paddle shafts 71 is journaled in a bearing 80 carried by a wing arm 79. As shown in FIG. 16, the paddle shafts 71 connect the mechanism at side B to that at side A.

In the embodiment of the invention shown in FIGS. 15 and 16, the center line spacing of the shafts 77 and 71 is so related to the center line distance between the shafts 75 and 77 that the path which is followed by the lower edges 70a of the paddles 70 across the conveyor is substantially a horizontal plane parallel to the surface of the conveyor 20. In FIG. 15 the path described by the lower edges 70a of the paddles 70 in their movement across the conveyor is indicated by a broken line 81. To effect such movement of the paddles a relatively large sprocket wheel 82 is fixed on the frame member 72 concentrically with the shaft 75 and another sprocket wheel 83 is fixed on an end portion of each of the shafts 77 for chain drive connection with the sprocket wheel 82. Sprocket wheels 84 are fixed on each wing arm 79 concentrically with its supporting shaft 77 and sprocket wheels 85 are fixed on an end of the connected paddle shaft 71 to turn the latter in timed relation to the turning of the arm structure 76. A chain 86 is trained on the sprocket wheels 82 and 83 and shorter chains 87 (FIG. 15) connect the several sprocket wheels 84 to the wheels 85.

In operation, when the motor 73 is energized the shaft 75 is rotated together with the arm structure 76. This structure carries with it the sprocket wheels 83 and mechanism for maintaining the paddles on each end of the arm structure in the depending positions from the shafts 71. Since the large sprocket wheel 82 is stationary, rotation of the arm structure 76 causes the wheels 83 to be turned together with the shafts 77. The shafts 77 now rotate the wing arms 79 about the axes of the shafts 77, thereby causing the center line or axis of each of the paddle shafts 71 to describe a path identical with the path described by the lower edges 70a of the paddles 70.

FIG. 15 shows in broken lines the position of the transfer mechanism when it has turned 90° from the full line position. The paddles 70 are generally rectangular in shape and their upper corner portions are cut away as indicated at 88 in FIG. 16 so that the paddles clear the mechanism supporting each shaft 71 when moved in their orbits about the axis of the shaft 75. It will be evident that the paddles 70 are retained in vertical planes parallel to the sides of the conveyor 20 as a result of the driving ratios between the sprocket wheels 82—83 and 84—85. To obtain this desirable result, the pitch diameter of the sprocket wheels 82 is to that of the sprocket wheels 83 as 3 to 1 and the pitch diameter of the sprocket wheels 84 is to that of the sprocket wheels 85 as 2 to 3.

By such means I minimize the radius of movement of the paddles 70 so that I greatly reduce the overhead space required for the operation of the transfer mechanism. For example, the radius of movement of the paddle shafts 71 for the modification shown in FIGS. 15 and 16 is approximately half of the radius of movement of the paddle shafts 54 shown in FIGS. 12-14 of the drawing. A limit switch and cam actuating means such as that shown in FIGS. 17 and 18 may be provided to deenergize the motor 73. Thus a cam like the cam 43 may be fixed on the shaft 75 to actuate a limit switch 42 mounted on the frame member 72. The limit switch is normally closed and is included in a conventional motor stop button circuit.

Any of the modifications of my invention herein described may be operated under control of an external memory signal system. Thus the motor connected to the transfer mechanism may be provided with a magnetic starter which is latched in when a starter signal is received.

A pair of paddles, as in each of the several modifications of the invention, are preferable for the diverting of most types of load units, but three or more load engaging paddles may be provided, severally spaced at predetermined positions and at equal distances from the central power driven shaft of the paddle supporting structure. Characteristics of all modifications of the invention are the unidirectional movement of the paddles either directly or obliquely crosswise of the conveyor, and the elongated surfaces of the paddles which contact large side areas of the several load units to not only control the direction of the diverting operation but also to minimize damage to the load units. Thus quick clearance of the area occupied by each load unit on the conveyor is accomplished with a minimum of damage to the load units resulting from the impact of the paddles. By locating a second paddle in position for instantaneous diverter movement at the end of each diverting operation, the efficiency and speed of diverting and sorting systems have been substantially increased, and load units of a greater variety of sizes, shapes and weights may be sorted automatically by the mechanism herein described.

I claim:
1. In combination with a conveyor for moving load units along a determined path, mechanism for removing such units laterally from said conveyor comprising, a tubular bearing and support for a rotary shaft mounted adjacent to said path, a first shaft journalled in said bearing, power means for rotating said shaft about its axis, a rigid paddle supporting structure fixed on said shaft and projecting therefrom to support paddle shafts, a plurality of paddle shafts carried by said structure and disposed in spaced parallel relation to said first shaft, and in predetermined spaced relation one to another, a load-engaging paddle carried by each of said paddle shafts and disposed to sweep across the path of the load units carried by said conveyor when said shafts are rotated, and power transmission linkage operatively connected to each of said paddle shafts for rotating them and the paddles carried thereby in unison.

2. A combination in accordance with claim 1 including means for interrupting the turning of said first shaft when it has turned through a predetermined angle to a position in which at least one of said paddles is in a retracted position at one side of the path of load units on said conveyor.

3. A combination in accordance with claim 2 in which said means for interrupting the turning of said shafts is operative when the shafts have turned a predetermined angle within the range 90° to 180° inclusive.

4. A combination in accordance with claim 1 in which said paddles have surfaces for contact with the several load units which are elongated in the direction of movement of the load units on said conveyor for impact with similar elongated side surfaces of the load units.

5. A combination in accordance with claim 4 in which said paddle surfaces are of such length as to contact a side surface of each load unit along a zone which is more than half the length of the load unit.

6. A combination in accordance with claim 4 in which said power transmission linkage connected to the several paddle shafts maintains said elongated surfaces of the several paddles in continuous substantially parallel relation to said elongated side surfaces of the load units during the rotation of said paddle shafts.

7. A combination in accordance with claim 1 including means for interrupting the turning of said first shaft when it has turned through a predetermined angle to a position wherein a plurality of said paddles are in retracted positions adjacent to the path of movement of load units along said conveyor.

8. A combination in accordance with claim 7 in which said paddles have surfaces for contact with the several load units which are elongated in the direction of movement of the load units on the conveyor and said elongated surfaces are disposed in parallel relation to the path of the load units along said conveyor when the turning of said first shaft is interrupted.

9. A combination in accordance with claim 1 in which said first shaft and paddle shafts are disposed with their axes substantially horizontal and at elevations above the path of the load units on said conveyor.

10. A combination in accordance with claim 9 including means for interrupting the turning of said first shaft intermittently when a pair of said paddles are disposed substantially in vertical planes at opposite sides of said conveyor.

11. A combination in accordance with claim 1 in which said first shaft and paddle shafts are disposed with their axes substantially vertical in a common plane at one side of the path of load units on said conveyor.

12. A combination in accordance with claim 11 in which said rigid paddle supporting structure carries a pair of paddle shafts disposed at 180° one from the other at opposite sides of said first shaft and each of said paddles has a horizontally elongated surface for impact with elongated side areas of the several load units.

13. A combination in accordance with claim 12 in which said power transmission linkage connected to the several paddle shafts maintains said elongated surfaces of the paddles in substantially parallel relation one to another during the rotation of said first shaft and paddle shafts.

14. A combination in accordance with claim 13 in which said power transmission linkage for each of said paddle shafts includes a gear wheel fixed on said tubular bearing for the first shaft coaxially therewith, a second gear wheel fixed on the paddle shaft, and means operatively connecting said gear wheels together for rotation at a speed equal to that of the speed of rotation of said first shaft.

15. A combination in accordance with claim 1 in which said first shaft and paddle shafts are disposed horizontally at elevations above the path of the load units on said conveyor, and including power actuated means for raising the mechanism comprising said tubular bearing, first shaft, paddle supporting structure, paddle shafts and paddles during the sweep of each paddle across the path of the load units, whereby the lower extremities of the paddles are caused to move substantially horizontally across said path.

16. A combination in accordance with claim 15 in which said power actuated means for raising said mechanism includes a wheel carried by said paddle supporting structure in coaxial relation to each of said paddle shafts, and a cam member having a horizontal surface for contact with said wheels disposed in the path of said wheels when said first shaft is rotated.

17. In combination with a conveyor for moving load units having elongated side surfaces along a determined path, mechanism for transferring such units laterally from said conveyor at an oblique angle thereto comprising, a fixed bearing and support for a rotary shaft mounted adjacent to said path, a first shaft journaled in said bearing, power means for turning said shaft about its axis, means for intermittently interrupting the turning of said shaft after each one-half of a revolution, a rigid paddle supporting structure fixed on said shaft to rotate therewith and projecting therefrom to support paddle shafts, a pair of rotary paddle shafts carried by said structure and disposed in equally spaced parallel relation to said first shaft at opposite sides thereof, a coaxial sleeve carried by said fixed bearing, power means operatively connected to said sleeve for imparting oscillating movement thereto in unison with the rotation of said first shaft, a paddle fixed on each of said paddle shafts and having an elongated surface of a shape corresponding to that of said side surfaces of the load units for contact therewith, said paddles being disposed to sweep across the path of the load units carried by said conveyor successively and in the same direction when said shafts are rotated, coaxially disposed gear wheels fixed on said sleeve, and endless chain drive means connecting said gear wheels to the several paddle shafts for rotating the latter in unison with the oscillating movement imparted by said sleeve whereby to maintain the paddles in predetermined angular positions corresponding approximately to the oblique angle of transfer laterally of said conveyor during the movement of each paddle across said path.

18. In combination with a conveyor for moving load units along a determined path, mechanism for transferring such units laterally from said conveyor comprising, a pair of tubular bearings and supports for a pair of coaxially disposed main shafts disposed horizontally at an elevation above said path, a pair of coaxially disposed main shafts journaled in bearings in said tubular supports, a pair of spaced parallel paddle supporting structures fixed on said shafts respectively to rotate therewith and projecting at opposite sides thereof, a wing shaft journaled in each end portion of each of said structures in equally spaced parallel relation to said first shafts and at opposite sides thereof, said wing shafts carried by one of said supporting structures being disposed coaxially with the wing shafts carried by the respective ends of the other supporting structure, a wing hanger fixed on each of said wing shafts and disposed in parallel relation to said wing hangers fixed on wing shafts of the other supporting structure, a paddle shaft journaled in each pair of parallel wing hangers and connecting the wing hangers together for rotary movement in unison, a paddle fixed on and depending from each of said paddle shafts and having a normally horizontal lower edge, a power actuating means operatively connected to at least one of said first shafts for turning it, means for intermittently interrupting the operation of said power actuating means, a first power transmitting means operatively connecting said first shafts to said wing shafts carried by the respective paddle supporting structures, and a second power transmitting means interconnecting each of said paddle shafts with one of said wing shafts, the speed ratio of said first power transmission means to said second power transmitting means being such as to maintain said paddles in substantially vertical planes during their movement across said path and to move said lower edges of said paddles substantially horizontally across said path.

No references cited.